United States Patent

Gutman et al.

[11] Patent Number: 5,429,742
[45] Date of Patent: Jul. 4, 1995

[54] PLASTIC FRAME FILTER UNIT FOR A STACK ASSEMBLY

[75] Inventors: Richard G. Gutman, Chichester; Roger A. Buttery, Petersfield; John A. G. Tolcher, Locks Heath, all of England

[73] Assignee: Pall Corporation, Glen Cove, N.Y.

[21] Appl. No.: 319,488

[22] Filed: Oct. 7, 1994

Related U.S. Application Data

[63] Continuation of Ser. No. 858,601, Mar. 27, 1992, abandoned.

[30] Foreign Application Priority Data

Mar. 27, 1991 [GB] United Kingdom ............. 9106481

[51] Int. Cl.$^6$ .................................................. B01D 61/50
[52] U.S. Cl. .......................... 210/321.75; 210/321.84; 210/484; 210/489; 210/495
[58] Field of Search ............. 210/321.64, 321.75, 210/321.84, 483, 484, 486, 488, 489, 495, 497.2, 509; 96/4

[56] References Cited

U.S. PATENT DOCUMENTS

| 2,758,083 | 8/1956 | Van Hoek et al. | 210/321.64 |
| 3,746,175 | 7/1973 | Markley | 210/321.64 |
| 3,976,576 | 8/1976 | Jacobsen et al. | |
| 4,016,081 | 4/1977 | Martinez et al. | 210/321.75 |
| 4,228,015 | 10/1980 | DeVries et al. | 210/321.75 |
| 4,310,416 | 1/1982 | Tanaka et al. | 210/321.75 |
| 4,929,354 | 5/1990 | Meyering et al. | 210/321.61 |
| 5,049,268 | 9/1991 | Kopf | 210/321.75 |

FOREIGN PATENT DOCUMENTS

| 1234283 | 6/1971 | United Kingdom . |
| 1494827 | 12/1977 | United Kingdom . |
| 2013522 | 8/1979 | United Kingdom . |
| 2063089 | 6/1981 | United Kingdom . |

Primary Examiner—Robert A. Dawson
Assistant Examiner—W. L. Walker
Attorney, Agent, or Firm—Leydig, Voit & Mayer

[57] ABSTRACT

A filter unit comprises a plastics frame into which a sheet of filter medium is insert moulded. Portions of the frame form apertures and other portions allow fluid access to and from the opposed surfaces of the filter medium when the frame is covered by a flat surface. The frames also form portions of an integral capsule enclosing the medium. A number of such filter units can be stacked together in various configurations so that the apertures form inlets and outlets for fluid so that, in some configurations, fluid can be passed through the filter units in parallel while, in other configurations, fluid can be passed through filter units in succession. Filters of any convenient size can be produced by increasing the number of filter units in a stack. The filters are bi-directional. The frames can be of polypropylene connected to hydrophilic microporous nylon membrane by injection moulding, which has been found to give a filter unit that can be integrity tested.

55 Claims, 6 Drawing Sheets

PLASTIC FRAME FILTER UNIT FOR A STACK ASSEMBLY

This application is a continuation of application Ser. No. 07/858,601, filed Mar. 27, 1992, now abandoned.

BACKGROUND TO THE INVENTION

1. Field of the Invention

The invention relates to filters and filter units.

2. Review of the Prior Art

In known filters, a number of filter units are formed together in a stack to provide a filter having a required surface area of filter medium. An example of this is shown in GB-A-2063089A.

This specification discloses a filter comprising a number of filter units which are formed by generally circular plastic supports with filter media bonded to their upper and lower surface. Radial passages in the support lead to a central aperture which, when the filter units are stacked together, forms an outlet for filtrate. The filter units are contained within a casing which provides an inlet for fluid being filtered.

It is a disadvantage of the arrangement of GB-A-2063089 that the filter units are complicated to manufacture and difficult to assemble. The flow is not fully reversible in this arrangement and the filter medium can only be encapsulated by the provision of a separate casing.

GB-A-1234283 shows a similar arrangement in which a disc-shaped holder carries filtering material. Each disc has peripheral apertures and a central aperture so that when the discs are stacked together, fluid to be filtered enters via the peripheral apertures and passes generally radially to the central aperture via the filtering material.

Again, these discs can only be encapsulated by the provision of a separate casing because of the peripheral apertures. The provision of such a casing adds to the cost and lengthens the manufacturing process.

SUMMARY OF THE INVENTION

According to a first aspect of the invention, there is provided a filter unit comprising a frame of a plastics material having first and second faces and defining a first aperture extending between the first and second faces at least one sheet of filter medium within the aperture a second aperture extending between the first and second faces and spaced from said first aperture the frame further comprising first means for communicating said first aperture to said second aperture on one side of said filter medium for the passage of fluid therebetween and a continuous peripheral member disposed between the first and second faces to provide a portion of a capsule for the at least one sheet of filter medium.

When filter units are manufactured using hydrophilic microporous nylon filter medium, it is customary to test them to ensure that the pore size of the filter medium has a specified value. This is done by an integrity test that involves wetting the membrane, removing excess water and applying air under pressure to one side of the filter medium. If the diffusive air flow rate is below a specified value at a specific air pressure, then the filter medium will quantitatively remove specified organisms.

A preferred material for the frame of such a unit is polypropylene because it can be moulded at relatively low pressures, it has a high resistance to autoclaving and produces low rates of extractables. However, polypropylene is hydrophobic and this has been found in joints between polypropylene end caps and nylon medium to produce a zone that is hydrophobic at the join between the polypropylene and the nylon medium. This prevents integrity testing in water because the hydrophobic zone allows the ready passage of air. It is, however, essential that the units are integrity testable.

According to a second aspect of the invention, there is provided a filter unit comprising a frame of polypropylene having first and second faces and defining a first aperture and at least one sheet of a hydrophilic microporous nylon filter medium within the first aperture a periphery provided around said one sheet of filter medium the periphery of the filter medium being insert moulded into the frame, a second aperture extending between the first and second faces and spaced from said first aperture first means for communicating said first aperture with said second aperture disposed to one side of said filter medium for the passage of fluid therebetween.

The use of injection moulding has been found to produce a filter unit that can be integrity tested in water.

According to a third aspect of the invention, there is provided a plurality of filter units, means defining an inlet, means defining an outlet and at least one filter unit comprising a frame of a plastics material having first and second faces and defining medium aperture; at least one sheet of filter medium held within the aperture extending between the first and second faces, the frame also defining an inlet passage extending between the first and second faces and communicating between the inlet means to one surface of the filter medium and an outlet passage extending from between the first and second faces and communicating between the other surface of the filter medium and the outlet means, the inlet means and the outlet means being in sealing engagement with the frame to encapsulate the filter medium.

According to a fourth aspect of the invention, there is provided a filter comprising an inlet means, an outlet means and at least one filter unit comprising a frame of polypropylene material having first and second faces and defining an aperture, at least one sheet of a hydrophilic microporous nylon filter medium held within the aperture extending between the first and second faces and including a periphery, the periphery of the filter medium being insert moulded into the frame, the frame also defining an inlet passage extending between the first and second faces and communicating between the inlet means to one surface of the filter medium and an outlet passage extending between the first and second faces and communicating between the other surface of the filter medium and the outlet means the filter being integrity testable in water.

The following is a more detailed description of some embodiments of the invention, by way of example, reference being made to the accompanying drawings in which:

DESCRIPTION OF THE PREFERRED EMBODIMENTS

Figure 1:
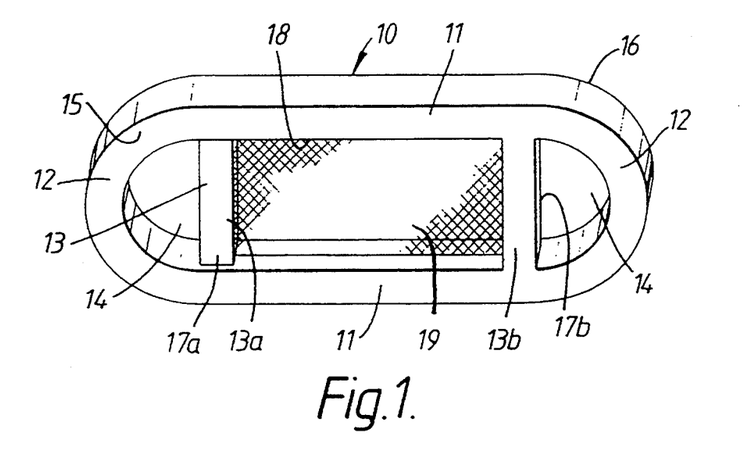
FIG. 1 is a schematic perspective view of a first form of filter unit having parallel sides and semi-circular ends and including an aperture containing a filter medium.

Referring first to FIG. 1, a filter unit comprises a frame 10 of a plastics material including a continuous peripheral member having parallel sides 11 and semi-circular ends 12. Additional members 13 extend across the diameters of the semi-circular ends to form semi-circular apertures 14.

Figures 3, 4:
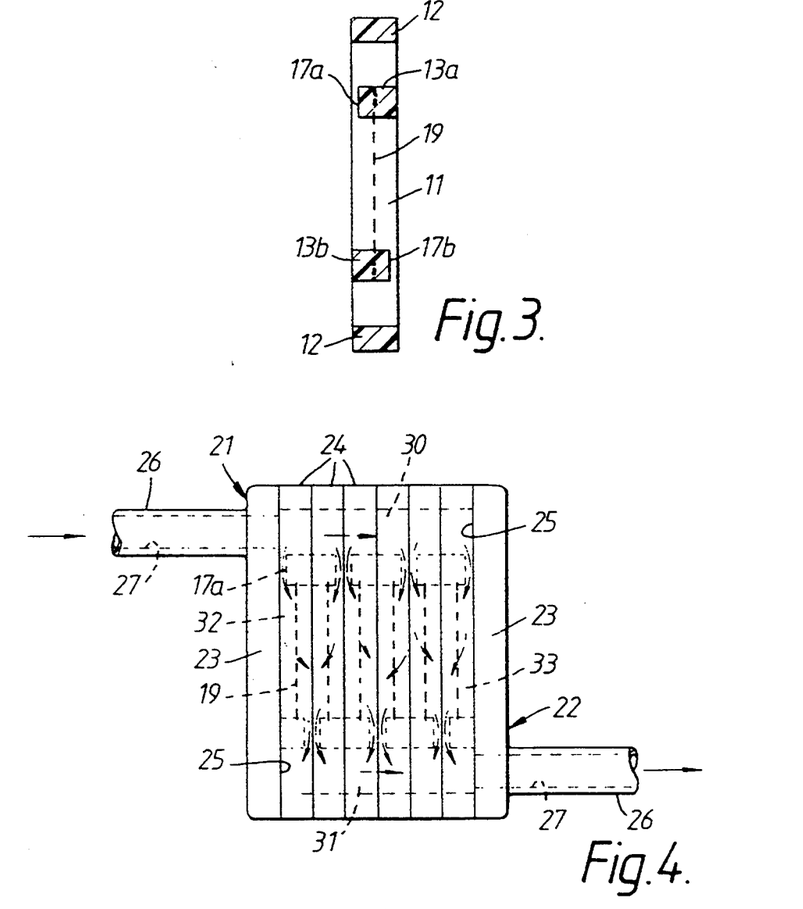
FIG. 3 is a cross-sectional view of a filter unit of the kind shown in either FIG. 1 or FIG. 2.
FIG. 4 is a schematic side elevation of a first form of filter incorporating an inlet manifold, an outlet manifold and six filter units of the kind shown in FIG. 3.

The frame members 10 are of generally rectangular cross-section and include opposed faces 15,16 lying in spaced mutually parallel planes. One of the additional members 13a has a recessed surface 17a at one side 15 of the frame 10 and the other additional member 13b has a recessed surface 17b at the other side 16 of the frame. This is best seen in FIG. 3.

The sides 11 and the additional members 13a, 13b define a generally rectangular aperture 18 which contains a sheet of a filter medium 19. The filter medium may be of any desired kind, for example polyamide, PVDF, PTFE, polypropylene fibres, or glass fibre.

Thus, one member 13a forms with the peripheral member, one of the apertures 14 and a part of the medium aperture 18. The other member 13b forms with the peripheral member the other of the apertures 14 and the remainder of the medium aperture 18. The recessed surface 17a forms a part passage between one aperture 14 and the medium aperture 18 and the recessed surface 17b forms a part passage between the other aperture 14 and the medium aperture 18.

The filter unit is formed as follows.

A sheet of filter medium 19 of suitable dimensions is inserted into an appropriately shaped mould. A plastics material having a lower melting point or a melting point not appreciably greater than the melting point of the filter medium 19 is then injected into the mould in a molten state. For example, the plastics material may be a polypropylene. The filter medium 19 is held so that its periphery extends into the portions of the mould that define the sides 11 and the additional members 13 of the frame. Thus, when the moulding process is complete, the periphery of the filter medium is insert moulded into the sides 11 and additional members 13 of the frame 10. The filter unit is then removed from the mould.

Figure 2:
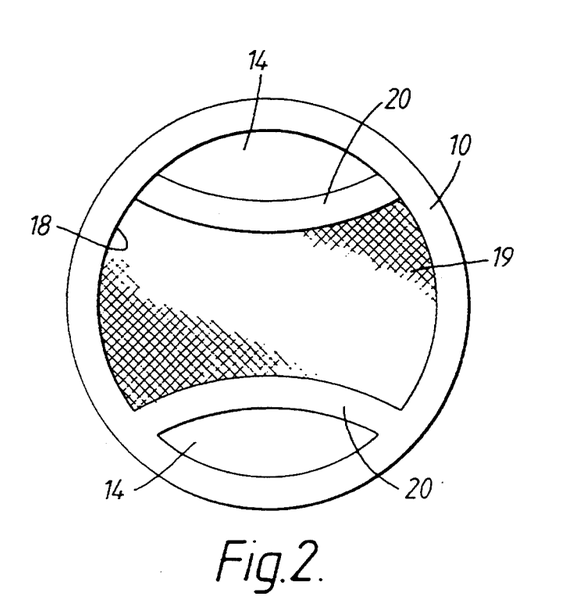
FIG. 2 is a plan view of a second form of filter unit of generally circular exterior shape and including an aperture containing a filter medium.

Referring next to FIG. 2, it will be appreciated that the filter unit need not be shaped as described above. In the embodiment of FIG. 2, the frame 10 has a peripheral member which is generally circular in plan view and is provided with additional members 20 which extend between spaced points on the frame with an arcuate curvature. Thus, each additional member 20 forms with the peripheral member an aperture 14 and a part of a medium aperture 18 which holds the filter medium 19. The members 20 are oppositely recessed, in the same way as the members 13 of the embodiment of FIG. 1. The filter unit of FIG. 2 is, however, made in the same way as a filter unit of FIG. 1.

These filter units may have a thickness of 3 mm with an area of filter medium of about 25 cm.

As will be seen in both units, the shape of the aperture 18 is symmetrical about a plane normal to the plane of the filter medium 19 and the planes of the faces 15,16 and the end apertures 14 are also symmetrically arranged on opposite sides of this plane. Of course, this is not essential; the apertures 14 could be arranged anywhere around the filter aperture 18 and the apertures 14 could be of differing shapes and sizes. Only one aperture 14 could be provided.

FIGS. 4 to 7 show embodiments of filters incorporating the filter units described above with reference to FIGS. 1 to 3. In all four embodiments, the filter includes an inlet manifold 21 and an outlet manifold 22 which are identical (but need not necessarily be so) and which will now be described briefly.

Each manifold 21,22 comprises a lid 23 having the same peripheral shape as the shape of the associated filter units 24. One surface 25 of the lid is flat and the other surface carries a tube 26 projecting from the lid 23 in a direction normal to the plane of the lid 23. A passage 27 extends through the tube from the surface 25.

The inlet and outlet manifolds 21,22 may conveniently be moulded from the same plastics material as the filter units (for example, polypropylene).

In the filter of FIG. 4, six filter units are arranged in a stack between an inlet manifold 21 and an outlet manifold 22. Alternate filter units 24 are reversed so that, as seen in FIG. 4, adjacent filter units 24 have respective recessed portions 17b facing one another to form a common passage 29 and have the other recessed portions 17a facing away from each other. The peripheral members of the frames 10 of the filter units 24 are in face-to-face sealing engagement. Further, the apertures 14 to one side of the plane of symmetry are all in register and the apertures 14 to the other side of the plane of symmetry are all in register with one line of apertures 14 communicating with the inlet manifold to form a single inlet 30 and the other line of apertures communicating with the outlet manifold 22 to form a single outlet 31.

One face of an end filter unit 24 contacts the surface 25 of the inlet manifold 21 so that the surface 15 of the frame 10 is in face-to-face sealing contact with the surface 25 of the lid 23. In this way, a chamber 32 is formed into which fluid to be filtered passes from the passage 27 to the inlet 30 and the recessed surface 17a.

The arrangement is similar at the outlet manifold 22. The other surface 15 of the frame 10 of the adjacent filter unit 24 adjacent the outlet manifold is in face-to-face sealing engagement with the surface 25 of the lid 23 of the outlet manifold 22. There is thus formed a chamber 33 in which fluid passes from filter medium 19 from which fluid leaves the recessed surface 17 through the outlet 31 and through the passage 27 in the outlet manifold 22.

Thus, as seen in FIG. 4, fluid to be filtered passes in the direction of the arrows in that Figure in parallel through the filter units 24 between the inlet 30 and the outlet 31. The assembly of the filter units 24 and the manifolds 21,22 thus provides the filter media 19 with an integral capsule. Since this is integral, it reduces the cost of the encapsulated filter and reduces the manufacturing time.

Figure 5:
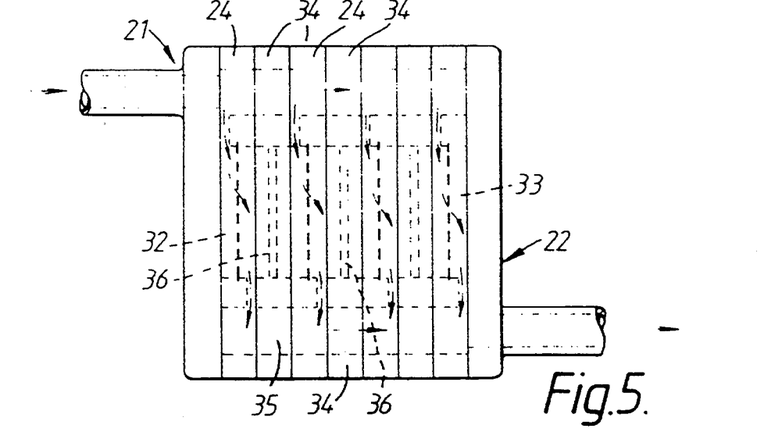
FIG. 5 is a side elevation of a second form of filter incorporating an inlet manifold and outlet manifold and four filter units of the kind shown in FIG. 3, with the filter units being separated by dividers.

Referring next to FIG. 5, the second form of filter is formed by an inlet manifold 21 and an outlet manifold 22 of the kind described above, with four filter units of the kind described above sandwiched in a stack between the manifolds 21,22. In this case, all the filter units are orientated in the same way so that all the passage parts 17a face in one direction and all the passage parts 17b face in an opposite direction. However, a divider 34 is provided between adjacent units. Each divider 34 is formed by a frame 35 of plastics material identical in shape and material to the frame of the filter unit 24. However, in place of the filter medium 19, each frame 35 is provided with an impervious barrier 36 in a central aperture. Thus, each divider 34 prevents communication between the medium apertures 18 of adjacent filter units 24 but does not interrupt the continuous inlet 30 and the continuous outlet 31.

The connection between the first filter unit 24 and the inlet manifold 21 and between the last filter unit 24 and the outlet manifold 22 is described above with reference to FIG. 4.

Thus, in this embodiment the fluid to be filtered also passes through the filter units 24 in the directions of the arrows in FIG. 5 in parallel between the inlet 30 and the outlet 31.

Figure 6:
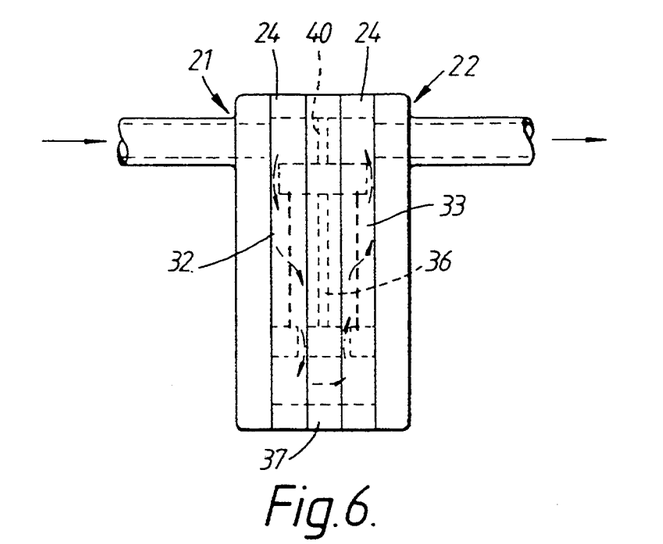
FIG. 6 is a side elevation of a third form of filter incorporating an inlet manifold, an outlet manifold and two filter units of the kind shown in FIG. 3 with the units being separated by a divider.

Referring next to FIG. 6, a third form of filter has an inlet manifold 21 and an outlet manifold 22 of the kind described above with reference to FIG. 4. Two filter units 24 are provided. One co-operates with the inlet manifold 21 as described above with reference to FIG. 4 and the other cooperates with the outlet manifold 22 as described above with reference to FIG. 4, but in this case the passages 27 in the manifolds 21,22 are coaxial, which means that the two filter units 24 are relatively oppositely arranged with the reverse sides 16 of the filter units adjacent one another.

A divider 37 separates the filter units 24. The divider 37 is the same as the divider 34 described above with reference to FIG. 5 except that a second barrier 40 is provided in an aperture 39 of the divider that is aligned with the passages 27 in the manifolds 21,22.

Thus, as seen in FIG. 6, fluid entering the inlet manifold 21 passes through the filter units 24 in succession in the directions of the arrows of FIG. 6 before leaving through the outlet manifold 22. This gives multi-stage filtration.

Figure 7:
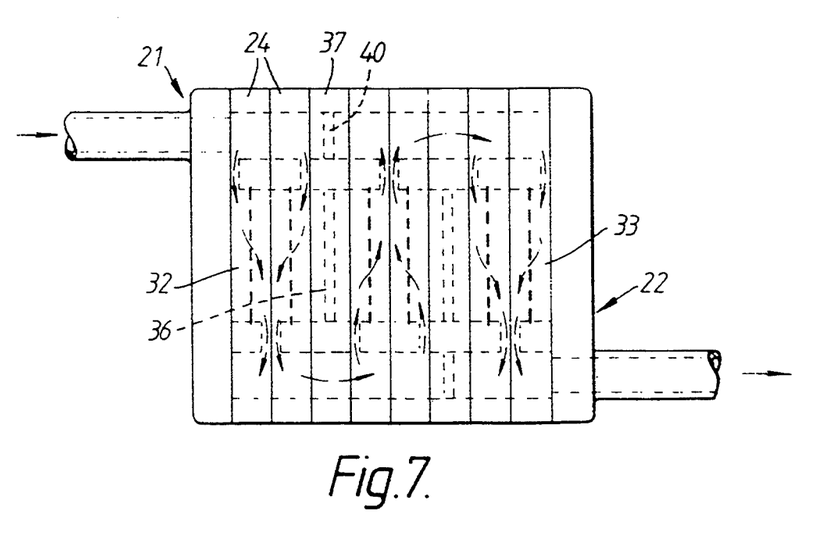
FIG. 7 is a side elevation of a fourth form of filter incorporating an inlet manifold, an outlet manifold and six filter units of the kind shown in FIG. 3 with successive pairs of filter units being separated by a divider.

The fourth form of filter shown in FIG. 7 has an inlet manifold 21 and an outlet manifold 22 of the kind described above. It includes six filter units 24 of the kind described above and two dividers 37 of the kind described above with reference to FIG. 5.

The filter units 24 are arranged in pairs, one filter unit of each pair being reversed relatively to the other filter unit of the pair. In this way, adjacent filter units have respective recessed surfaces 17b facing one another to form a common passage and respective recessed portions 17a facing away from each other. The remainder of the frame 10 of the filter units 24 of a pair are in face-to-face sealing engagement and the apertures 14 of the filter units 24 of the pair register to form a single inlet 30 and a single outlet 31.

A divider 37 is provided between successive pairs with a main barrier 36 preventing communication between adjacent media apertures and the second barrier 40 preventing communication between the inlet 30 of the first pair and the outlet 31 of the second pair, in the direction of flow of the fluid being filtered.

The connection between the first filter unit 24 and the inlet manifold 21 and between the last filter unit 24 and the outlet manifold 22 is as described above with reference to FIG. 4.

Thus, as seen in FIG. 7, the fluid to be filtered passes through the pairs of filter units 24 in succession in the directions of the arrows in FIG. 7 from the inlet manifold 21 to the outlet manifold 22, thus giving multi-stage filtration.

Figure 8:
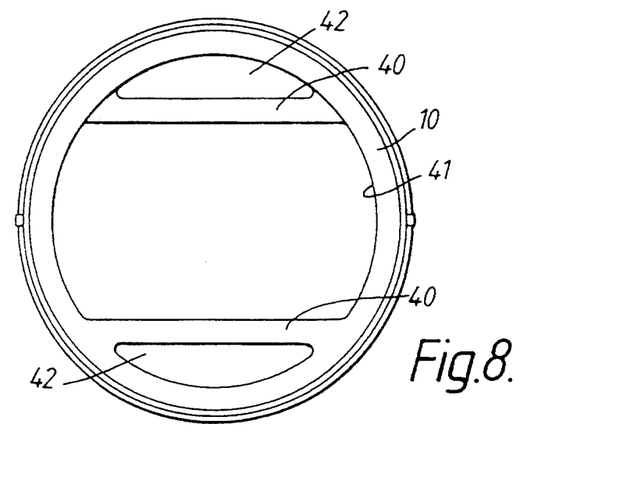
FIG. 8 is a plan view of a third form of filter unit of generally circular exterior shape and including an aperture containing a filter medium.

Referring next to FIG. 8, parts common to FIG. 8 and to FIG. 2 will be given the same reference numerals and will not be described in detail. In this filter unit, the frame 10 has a peripheral member which is generally circular in plan view and is provided with additional members 40 that are straight and extend parallel to one another as chords to the circular frame 10. The additional members 40 and the frame 10 form an aperture 41 containing a filter medium and end apertures 42 and are recessed in the same way as the members 13 of FIG. 1. The filter unit of FIG. 8 is formed in the same way as the filter units of FIGS. 1 and 2.

Figure 9:
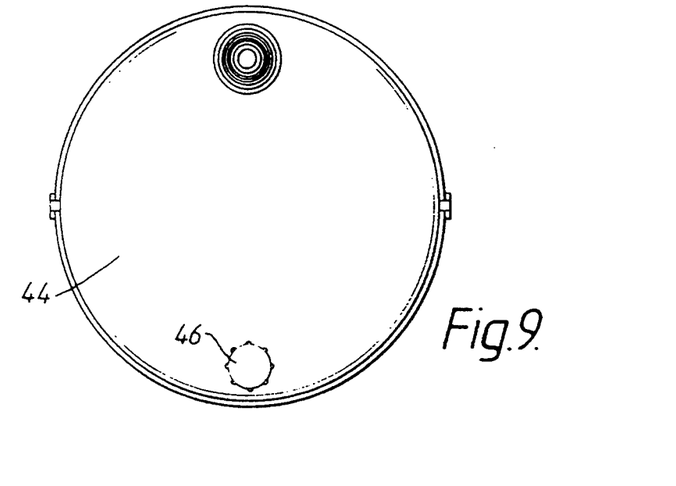
FIG. 9 is a plan view of a fifth form of filter incorporating filter units of the kind shown in FIG. 8.
Figure 10:
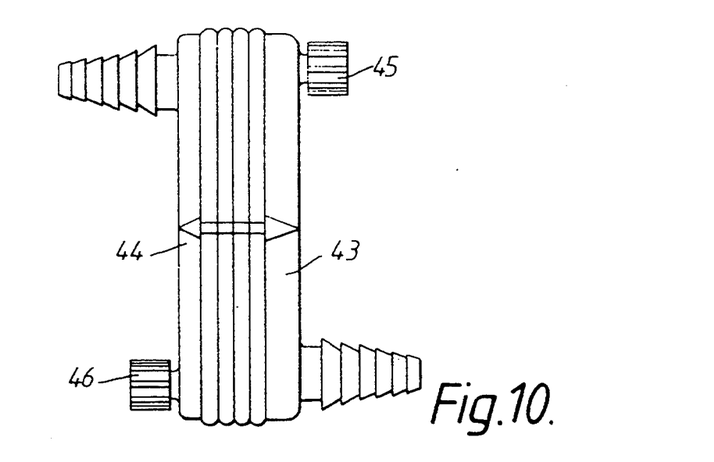
FIG. 10 is a side elevation of the fifth form of filter shown in FIG. 9.

As shown in FIGS. 9 and 10, a number of the filter units of FIG. 8 can be formed into a filter in any of the configurations described above with reference to FIGS. 4 to 7. The inlet and outlet manifolds 43,44 are similar to the inlet and outlet manifolds 21,22 except that the inlet manifold 43 is provided with a vent 45 and the outlet manifold is provided with a drain 46.

Figure 11:
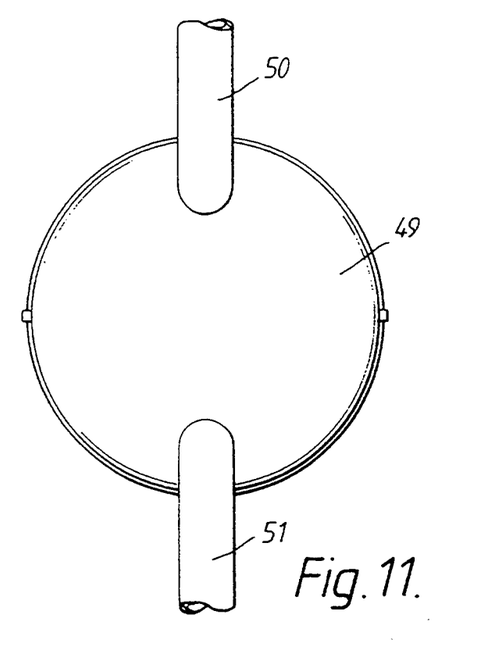
FIG. 11 is a plan view of a sixth form of filter incorporating filter units of the kind shown in FIG. 8.
Figure 12:
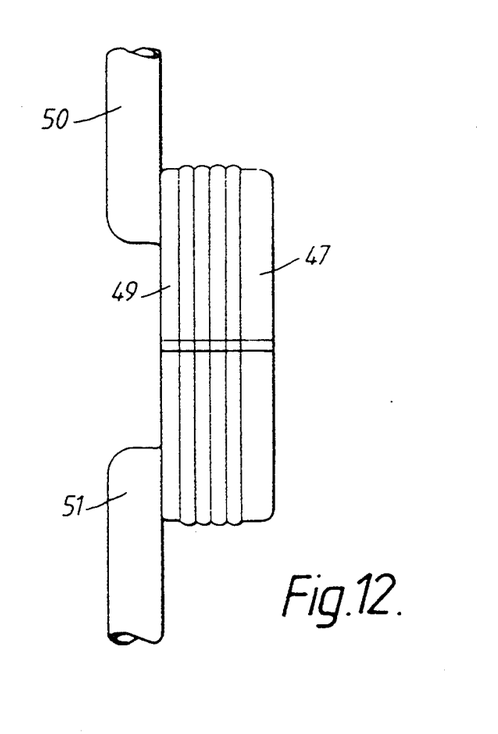
FIG. 12 is a side elevation of the sixth form of filter shown in FIG. 11.

Referring next to FIGS. 11 and 12, in this filter a number of filter units of the kind described with reference to FIG. 8 are arranged in the same configuration as the filter units 24 in FIG. 4. In this filter, however, one end of the stack of filter units is closed by a blank plate 47 while the manifold 49 includes both an inlet 50 and an outlet 51. A filter of this kind can be stood on a flat surface.

Figure 13:
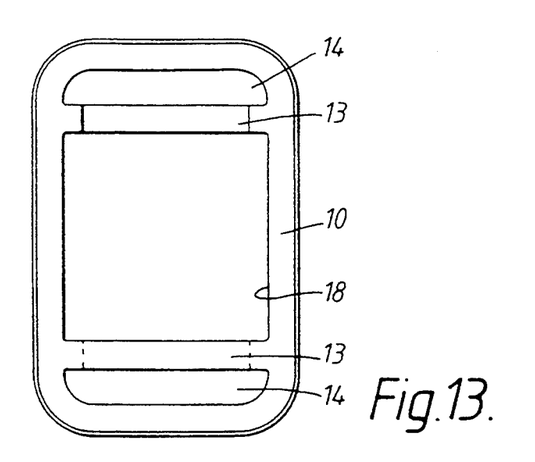
FIG. 13 is a plan view of a fourth form of filter unit of generally rectangular exterior shape and including an aperture containing a filter medium.

The fifth filter unit shown in FIG. 13 has parts common to the filter unit of FIG. 1 and parts common to these units will be given the same reference numerals and will not be described in detail. In this filter unit, the frame 10 has a peripheral member that is generally rectangular in shape with rounded corners. The additional members 13 extend between the longer sides of the rectangle parallel to and spaced from the shorter sides. The additional members 13 form an aperture 51 for filter medium and end apertures 52. The filter unit of FIG. 12 is formed in the same way as the filter units of FIGS. 1 and 2.

Figure 14:
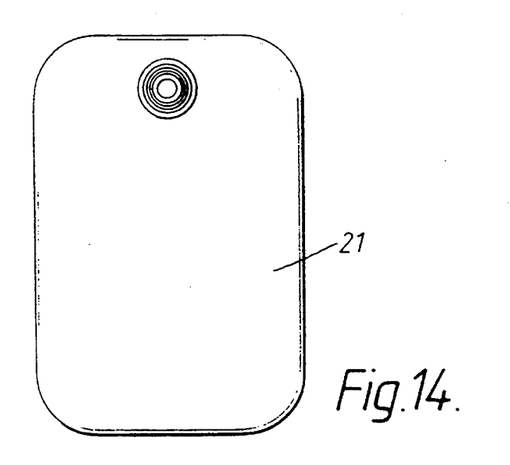
FIG. 14 is a plan view of a seventh form of filter incorporating filter units of the kind shown in FIG. 13.
Figure 15:
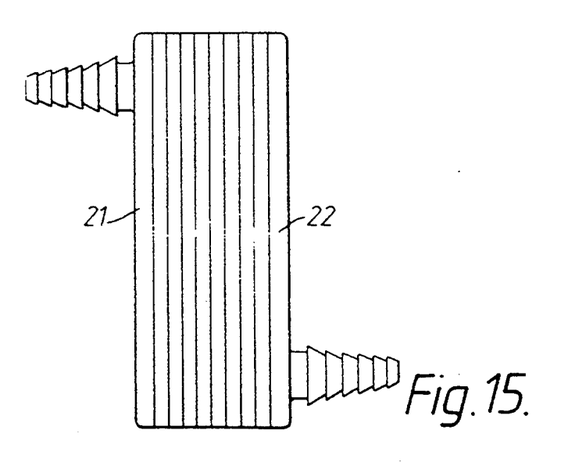
FIG. 15 is a side elevation of the seventh form of filter.

As shown in FIGS. 14 and 15 a number of the filter units may be formed into a filter in any of the configurations described above with reference to FIGS. 4 to 7, with inlet and outlet manifolds 21,22.

The manifolds 21,22,49, the blank plate 47 and the filter units of any of the embodiments described above may be joined by any convenient method. For example, they could be joined by ultrasonic welding, by platen welding, by radio-frequency welding or by adhesives or they could be clamped by mechanical means with gaskets between them.

Of course, the configurations of filter units described above with reference to FIGS. 4 to 8 and 13 are not the only possible configurations. There are many others in which units or groups of units are arranged in series or in parallel or in parallel groups arranged in series. In this latter case, each group of parallel filter units need not contain the same number of filter units.

It will also be appreciated that the rating of the filter medium may vary between filter units in a filter to give desired filtration characteristics. For example, the group of filter units nearest the inlet manifold may have a coarser rating than succeeding media to provide a pre-filter.

All the filters described above with reference to the drawings are bi-directional (subject to the media being suitably supported as described below). Thus, although the manifolds 21,22,47 are described as inlet and outlet manifolds, their functions could be reversed so that the outlet manifold becomes the inlet manifold. This means that the filters can be connected up to a feed and a drain in either orientation.

The number of filter units in any filter may be varied as required to give a required filter area. For example, if each filter unit has an area of 25 cm², the filter of FIG. 4 will have a total area of 150 cm², that of FIG. 5 an area of 100 cm² that of FIG. 6 an area of 25 cm² in series with an area of 25 cm² and that of FIG. 7 an area of 50 cm² in series with two further areas of 50 cm². Of course, greater areas can be achieved by using more units or by making the area of each unit greater.

In any of the embodiments described above with reference to the drawings, the filter medium will usually be be overlaid for example with a supportive mesh or corrugated porous sheet. Alternatively, the filter units could be moulded with integral ribs that overlie one or both sides of the filter medium. Where dividers are provided, they could be moulded with integral ribs arranged to support adjacent filter media. There may be more than one layer of filter medium in each unit. For example, there may be face-to-face layers of filter medium in each unit.

In all the embodiments described above with reference to the drawings, the frame 10 may be of any suitable plastics material such as nylon, polyester or polypropylene. Polypropylene has the advantage that it is easily moulded at relatively low pressures. It has high resistance to autoclaving and so can be autoclaved a substantial number of times without deterioration in performance. In use, it gives a very low rate of extractables (i.e. a low amount of extraneous substances introduced into the fluid being filtered as a result of the passage of the fluid through the filter).

Where the filter medium is a hydrophilic nylon medium, such as the medium described and claimed in EP-A-0005536, it is manufactured to remove organisms, such as bacteria, above a specified size. One method of testing the removal rating of such a medium is by integrity testing.

In such a test, a filter of the kind described above is wetted with water and surplus water is removed. Air is applied to one side of the unit at a specified pressure and the diffusive air flow rate is measured. This diffusive air flow rate has been found to be related to the removal rating of the medium.

A cruder measure of integrity can be determined by visual inspection of bubbles emerging from the filter medium. The integrity of the membrane is confirmed when the pressure at which the first bubble emerges from the filter membrane is not less than a predetermined normal pressure for that grade of medium.

However, polypropylene is inherently hydrophobic. It is found in joints between polypropylene end caps and hydrophilic microporous nylon membrane that this generally produces at the join between the filter medium and the end cap a zone that is not water wettable at normal forward flow test pressures. As a result, this zone is not wetted by liquid during the forward flow test and thus allows the ready passage therethrough of air. When such a filter is forward flow tested, the air flow exceeds the predetermined normal flow at pressures less than the test pressure. Thus, such filters cannot be forward flow tested in water.

However, it has been found that when, as described above, a polypropylene frame 10 is joined by injection moulding to a hydrophilic microporous nylon membrane 19 such as that sold by Pall Corporation under the trade mark ULTIPOR, no such hydrophobic zone is produced. Thus the filter unit so produced can be integrity tested in water, and this is a significant advantage.

The filters and filter units described above with reference to the drawings may be used in process development to provide scale-up data using the same materials as larger scale pleated filters. They may also have biomedical uses such as the provision of sterile water in hospitals for, for example, patient washing.

What we claim is:

1. A filter unit comprising a frame of a plastic material having first and second faces and defining a first aperture extending between the first and second faces, at least one sheet of filter medium within the first aperture and connected to the frame around the aperture and a second aperture extending between the first and second faces and spaced from said first aperture, the frame further comprising first means for communicating said first aperture to said second aperture on one side of said filter medium for the passage of fluid therebetween and a continuous peripheral member disposed between the first and second faces to provide a portion of a capsule for the at least one sheet of medium.

2. A filter unit according to claim 1 wherein the frame defines a third aperture spaced from said first aperture and second means for communicating said first aperture to the third aperture disposed on a side of said filter medium opposite the side of the filter medium of said first means for communicating.

3. A filter unit according to claim 2 wherein the frame includes a first member which defines a first passage forming said first means for communicating and a second member which defines a second passage forming said means for communicating.

4. A filter unit according to claim 3 wherein the first member defines, with the peripheral member, the second aperture and a part of the first aperture.

5. A filter unit according to claim 3 wherein the second member defines, with the peripheral member, the third aperture and a part of the first aperture.

6. A filter unit according to claim 3 wherein the frame has opposed faces lying in respective planes that are mutually parallel and are parallel to the plane of the filter medium.

7. A filter unit according to claim 6 wherein said first member is recessed relative to one face of the frame to form said first passage, the second member being recessed relative to the other face of the frame to form said second passage.

8. A filter unit according to claim 1 wherein the frame is formed from a plastics material having a lower melting point than the material of the filter medium.

9. A filter unit according to claim 1 wherein the filter medium is made of a material selected from the group of polyamide, PVDF, PTFE, polypropylene fibres, glass fibre.

10. A filter unit according to claim 3 wherein the shape of the first aperture is symmetrical about a plane normal to the plane of the filter medium, the second and third apertures also being symmetrically arranged on opposite sides of said plane.

11. A filter unit according to claim 10 wherein the continuous peripheral member of the frame has parallel sides and first and second semi-circular ends, the first member extending across the diameter of the first semi-circular end and the second member extending across the diameter of the second semi-circular end.

12. A filter unit according to claim 10 wherein the continuous peripheral member of the frame is circular, the first and second members being of curved arcuate shape and extending between respective spaced points on the continuous peripheral member.

13. A filter unit according to claim 10 wherein the continuous peripheral member of the frame is circular, the first and second members being straight and extending parallel relative to one another between respective spaced points on the continuous peripheral member.

14. A filter unit according to claim 10 wherein the continuous peripheral member is generally rectangular with rounded corners to provide two longer sides and two shorter sides, the first and second members extending between the longer sides of the peripheral member and parallel to the shorter sides.

15. A filtered unit comprising a frame of polypropylene having first and second faces and defining a first aperture extending between the first and second faces, at least one sheet of a hydrophilic microporous nylon filter medium within the first aperture, a periphery provided around said one sheet of filter medium, the periphery of the filter medium being insert molded into the frame, a second aperture extending between the first and second faces and spaced from said first aperture, and first means for communicating said first aperture with said second aperture disposed to one side of said filter medium for the passage of fluid therebetween.

16. A filter unit according to claim 15 wherein the frame defines a third aperture spaced from said first aperture and second means for communicating said first aperture to the third aperture disposed to a side of said filter medium opposite the side of the filter medium of said first-mentioned communicating means.

17. A filter unit according to claim 16 wherein the frame includes a first member which defines a first passage forming said first means for communicating and a second member which defines a second passage forming said second means for communicating.

18. A filter unit according to claim 7 wherein the first member defines, with the peripheral member, the second aperture and a part of the first aperture.

19. A filter unit according to claim 7 wherein the second member defines, with the peripheral member, the third aperture and a part of the first aperture.

20. A filter unit according to claim 17 wherein the frame has opposed faces lying in respective planes that are mutually parallel and are parallel to the plane of the filter medium.

21. A filter unit according to claim 20 wherein said first member is recessed relative to one face of the frame to form said first passage, the second member being recessed relative to the other face of the frame to form said second passage.

22. A filter unit according to claim 15 wherein the frame is formed from a plastics material having a lower melting point than the material of the filter medium.

23. A filter unit according to claim 15 wherein the filter medium is made of a material selected from the group of polyamide, PVDF, PTFE, polypropylene fibres, glass fibre.

24. A filter unit according to claim 17 wherein the shape of the first aperture is symmetrical about a plane normal to the plane of the filter medium, the second and third apertures also being symmetrically arranged on opposite sides of said plane.

25. A filter unit according to claim 24 wherein the continuous peripheral member of the frame has parallel sides and first and second semi-circular ends, the first member extending across the diameter of the first semi-circular end and the second member extending across the diameter of the second semi-circular end.

26. A filter unit according to claim 24 wherein the continuous peripheral member of the frame is circular, the first and second members being of curved arcuate shape and extending between respective spaced points on the continuous peripheral member.

27. A filter unit according to claim 24 wherein the continuous peripheral member of the frame is circular, the first and second members being straight and extending parallel relative to one another between respective spaced points on the continuous peripheral member.

28. A filter unit according to claim 24 wherein the continuous peripheral member is generally rectangular with rounded corners to provide two longer sides and two shorter sides, the first and second members extending between the longer sides of the peripheral member parallel to the shorter sides.

29. A filter comprising:
a plurality of filter units; means defining an inlet; means defining an outlet and at least one filter unit comprising a frame of a plastic material having first and second faces and defining a medium aperture; at least one sheet of filter medium held within the aperture extending between the first and second faces, the frame also defining an inlet passage extending between the first and second faces and communicating between the inlet means to one surface of the filter medium and an outlet passage extending from between the first and second faces and communicating between the other surface of the filter medium and the outlet means, the inlet means and the outlet means being in sealing engagement with the frame to encapsulate the filter medium.

30. A filter according to claim 29 wherein the inlet passage includes an inlet aperture defined by the frame and the outlet passage includes an outlet aperture defined by the frame.

31. A filter according to claim 30 wherein the frame includes a peripheral member having opposed faces which lie in spaced planes that are mutually parallel and which are parallel to the plane of the filter medium, the filter medium being located between said faces.

32. A filter according to claim 31 wherein a first member of the frame defines with the peripheral member both a part of the medium aperture and the inlet aperture and a second member of the frame defines with the peripheral member both a part of the medium aperture and the outlet aperture, said first and second members being recessed to provide parts of the inlet and outlet passages respectfully, one of said passage parts communicating between the inlet aperture and one surface of the filter medium and the other of said passage parts communicating between the surface of the filter medium opposite said one surface and the outlet aperture.

33. A filter according to claim 32 and including an inlet manifold which provides said inlet means, one face of said at least one filter unit contacting said inlet manifold, the at least one filter unit forming with the inlet manifold, a chamber into which fluid to be filtered passes from said inlet manifold and through said inlet aperture and the inlet passage to said one surface of the filter medium.

34. A filter according to claim 33 and including an outlet manifold which provides said outlet means, the other face of said at least one filter unit contacting the outlet manifold, the at least one filter unit forming with the outlet manifold, a chamber into which fluid passes from the filter medium of the at least one filter unit after filtration and from which fluid leaves through the outlet passage, said outlet aperture and said outlet manifold.

35. A filter according to claim 32 wherein a manifold provides the inlet and the outlet means and closes one face of the at least one filter unit, the other face of the at least one filter unit being closed by a plate.

36. A filter according to claim 32 wherein a plurality of filter units are provided, the peripheral members of the filter units being in successive face-to-face contact.

37. A filter unit according to claim 36 wherein the peripheral member has a shape that is symmetrical about a plane normal to the planes of said faces of the peripheral member, the medium aperture also being symmetrical about said plane and the inlet and outlet apertures being symmetrically arranged on opposite sides of said plane.

38. A filter according to claim 37 wherein alternate filter units of the plurality of filter units are reversed so that adjacent filter units have respective ones of said passage parts to one side of said plane facing one another to form a common passage part and respective others of said passage parts to the other side of said plane facing away from each other, the peripheral members of adjacent filter units being in face-to-face sealing engagement and the inlet and outlet apertures of the filter units registering to form a single inlet and a single outlet respectively so that fluid to be filtered passes through the filter units in parallel.

39. A filter unit according to claim 37 wherein the filter units are arranged in pairs, one filter unit of each pair being reversed relative to the other filter unit of said pair so that the filter units of each pair have respective ones of said passage parts disposed to one side of said plane facing one another to form a common passage part and respective others of said passage parts disposed to the other side of said plane facing away from each other, the peripheral members of the filter units of each pair being in face-to-face sealing engagement and the inlet and outlet apertures of the filter units of each pair registering to form a single inlet and a single outlet, successive pairs of filter units being arranged so that the single outlet of one of the pairs leads to the single inlet of a succeeding pair, a divider being provided between successive pairs preventing communication between adjacent medium apertures and between an inlet of a first pair and an outlet of a second pair of successive pairs, in the direction of flow of the fluid being filtered, so that fluid to be filtered passes through each pair in succession.

40. A filter unit according to claim 37 wherein a plurality of filter units are provided, the units all being similarly orientated so that the passage parts to one side of said plane all face in one direction and the passage parts to the other side of said plane all face in an opposite direction with the inlet apertures thereof in register to one side of said plane and with the outlet apertures thereof in register to the other side of said plane, a divider being provided between adjacent units preventing communication between adjacent media apertures so the fluid to be filtered passes through the filter units in parallel.

41. A filter unit according to claim 37 wherein successive filter units are arranged so that, in the direction of flow of the fluid being filtered, an outlet aperture of one filter unit leads to the inlet aperture of the succeeding filter unit, a divider being provided between successive filter units preventing communication between adjacent media apertures and the inlet of the first filter unit of successive filter units, in the direction of flow and the outlet of the succeeding filter unit so that fluid to be filtered passes through the filter units in succession.

42. A filter comprising:
means defining an inlet, means defining an outlet and at least one filter unit comprising a frame of polypropylene material having first and second faces and defining an aperture, at least one sheet of a hydrophilic microporous nylon filter medium held within the aperture extending between the first and second faces and including a periphery, the periphery of the filter medium being insert moulded into the frame, the frame also defining an inlet passage extending between the first and second faces and communicating between the inlet means to one surface of the filter medium and an outlet passage extending between the first and second faces and communicating between the other surface of the filter medium and the outlet means, the filter being integrity-testable in water.

43. A filter according to claim 42 wherein the inlet passage includes an inlet aperture defined by the frame and the outlet passage includes an outlet aperture defined by the frame.

44. A filter according to claim 43 wherein the frame includes a peripheral member having opposed faces which lie in spaced planes that are mutually parallel and which are parallel to the plane of the filter medium, the filter medium being located between said faces.

45. A filter according to claim 44 wherein a first member of the frame defines with the peripheral member both a part of the medium aperture and an inlet aperture and a second member of the frame defines with the peripheral member both a part of the medium aperture and an outlet aperture, the first and second members being recessed to provide parts of the inlet and outlet passages respectfully, one of said passage parts communicating between the inlet aperture and one surface of the filter medium and the other of said passage parts communicating between the surface of the filter medium opposite said one surface and the outlet aperture.

46. A filter according to claim 45 and including an inlet manifold which provides said inlet means, one face of said at least one filter unit contacting said inlet manifold, the at least one filter unit forming with the inlet manifold, a chamber into which fluid to be filtered passes from said inlet manifold and through the inlet aperture and the inlet passage disposed to said one surface of the filter medium.

47. A filter according to claim 46 and including an outlet manifold which provides said outlet means, the other face of said at least one filter unit contacting the outlet manifold, the at least one filter unit forming with the outlet manifold, a chamber into which fluid passes from the filter medium of the at least one filter unit after filtration and from which fluid leaves through the outlet passage, the outlet aperture and said outlet manifold.

48. A filter according to claim 45 wherein a manifold provides the inlet and the outlet passages and closes one face of the at least one filter unit, the other face of the at least one filter unit being closed by a plate.

49. A filter according to claim 45 wherein a plurality of filter units are provided, the peripheral members of the filter units being in successive face-to-face contact.

50. A filter unit according to claim 49 wherein the peripheral member has a shape that is symmetrical about a plane normal to the planes of said faces of the peripheral member, the medium aperture also being symmetrical about said plane and the inlet and outlet apertures being symmetrically arranged on opposite sides of said plane.

51. A filter according to claim 50 wherein alternate filter units of the plurality of filter units are reversed so that adjacent filter units have respective ones of said passage parts to one side of said plane facing one another to form a common passage part and respective others of said passage parts to the other side of said plane facing away from each other, the peripheral members of adjacent filter units being in face-to-face sealing engagement and the inlet and outlet apertures of the filter units registering to form a single inlet and a single outlet respectively so that fluid to be filtered passes through the filter units in parallel.

52. A filter unit according to claim 51 wherein the filter units are arranged in pairs, one filter unit of each pair being reversed relatively to the other filter unit of said pair so that the filter units of each pair have respective ones of said passage parts to one side of said plane facing one another to form a common passage part and respective others of said recessed portions to the other side of said plane facing away from each other, the peripheral members of the filter units of a pair being in face-to-face sealing engagement and the inlet and outlet apertures of the filter units of the pair registering to form a single inlet and a single outlet, successive pairs of filter units being arranged so that the single outlet of one pair leads to the single inlet of the succeeding pair, a divider being provided between successive pairs preventing communication between adjacent media apertures and between the inlet of the first pair and the outlet of the second pair of successive pairs, in the direction of flow of the fluid being filtered, so that fluid to be filtered passes through the pairs in succession.

53. A filter unit according to claim 51 wherein each of the plurality of filter units are similarly orientated so that the passage parts to one side of said plane all face in one direction and the passage parts to the other side of said plane all face in an opposite direction with the inlet apertures thereof in register to one side of said plane and with the outlet apertures thereof in register to the other side of said plane, a divider being provided between adjacent units preventing communication between adjacent medium apertures so the fluid to be filtered passes through the filter units in parallel.

54. A filter unit according to claim 51 wherein successive filter units are arranged so that, in the direction of flow of the fluid being filtered, the outlet aperture of one filter unit leads to the inlet aperture of the succeeding filter unit, a divider being provided between successive filter units preventing communication between adjacent medium apertures and the inlet aperture of the first filter unit of successive filter units, in the direction of flow and the outlet aperture of the succeeding filter unit so that fluid to be filtered passes through the filter units in succession.

55. A filter according to claim 42 wherein the at least one filter unit includes first means for communicating said inlet passage with said outlet passage to one side of said filter medium for the passage of fluid therebetween.

* * * * *

UNITED STATES PATENT AND TRADEMARK OFFICE
CERTIFICATE OF CORRECTION

PATENT NO. : 5,429,742
DATED : July 4, 1995
INVENTOR(S) : Gutman et al.

It is certified that error appears in the above-indentified patent and that said Letters Patent is hereby corrected as shown below:

Title Page
Item 30, Foreign Application Priority Data, change "9106481" to --9106481.6--.

Column 10, Line 1, change "7" to --17--;

Line 4, change "7" to --17--.

Column 11, Line 18, change "parts-communicating" to --parts communicating--.

Signed and Sealed this

Tenth Day of October, 1995

Attest:

BRUCE LEHMAN

*Attesting Officer*     *Commissioner of Patents and Trademarks*